United States Patent
Meyer Zu Helligen et al.

(10) Patent No.: US 9,433,140 B2
(45) Date of Patent: Sep. 6, 2016

(54) VISUALIZATION DEVICE

(71) Applicants: Lars Peter Meyer Zu Helligen, Spenge (DE); Kalle Weiland, Bielefeld (DE)

(72) Inventors: Lars Peter Meyer Zu Helligen, Spenge (DE); Kalle Weiland, Bielefeld (DE)

(73) Assignee: CLAAS E-Systems KGaA mbH & Co KG, Guetersloh (DE)

( * ) Notice: Subject to any disclaimer, the term of this patent is extended or adjusted under 35 U.S.C. 154(b) by 163 days.

(21) Appl. No.: 13/648,326

(22) Filed: Oct. 10, 2012

(65) Prior Publication Data

US 2013/0103269 A1   Apr. 25, 2013

(51) Int. Cl.
  A01B 79/00    (2006.01)
  A01B 69/00    (2006.01)

(52) U.S. Cl.
  CPC ........... A01B 79/005 (2013.01); A01B 69/001 (2013.01)

(58) Field of Classification Search
  CPC .......... B60W 10/30; B60W 2300/15; B60W 2300/152; B60W 2300/154; B60W 2300/156; B60W 2300/158; A01B 69/001; A01B 79/005
  USPC .............................................. 701/36, 49, 50
  See application file for complete search history.

(56) References Cited

U.S. PATENT DOCUMENTS

| | | | |
|---|---|---|---|
| 5,862,372 A * | 1/1999 | Morris et al. ................. | 717/109 |
| 6,085,134 A | 7/2000 | Adam | |
| 7,739,015 B2 | 6/2010 | Senneff et al. | |
| 2003/0109975 A1* | 6/2003 | Paice ..................... | A01B 63/00 701/50 |
| 2004/0056839 A1* | 3/2004 | Yoshihara ..................... | 345/156 |
| 2007/0255470 A1* | 11/2007 | Diekhans ............. | A01B 69/008 701/50 |
| 2009/0037041 A1* | 2/2009 | Senneff ................ | A01B 69/008 701/23 |
| 2009/0070121 A1* | 3/2009 | Leonelli ............... | G06Q 10/103 705/301 |
| 2011/0106422 A1* | 5/2011 | Gould .................. | A01B 69/001 701/533 |
| 2011/0257850 A1* | 10/2011 | Reeve .................... | G06Q 10/04 701/50 |
| 2012/0209506 A1* | 8/2012 | Tamayama et al. .......... | 701/410 |

FOREIGN PATENT DOCUMENTS

| | | |
|---|---|---|
| EP | 0 820 688 | 1/1998 |
| EP | 2 020 170 | 2/2009 |

* cited by examiner

*Primary Examiner* — Aaron L Troost
(74) *Attorney, Agent, or Firm* — Michael J. Striker

(57) ABSTRACT

A device for visualizing control operations of an agricultural working machine includes a visualization device that visualizes at least one driving path to be traveled is assigned to the agricultural working machine. Control operations are stored in graphic images and the graphic images are displayed in the visualization device along the driving path to be traveled in the order in which they are carried out, to maintain an operator in an informed state with respect to the control processes that are taking place.

18 Claims, 4 Drawing Sheets

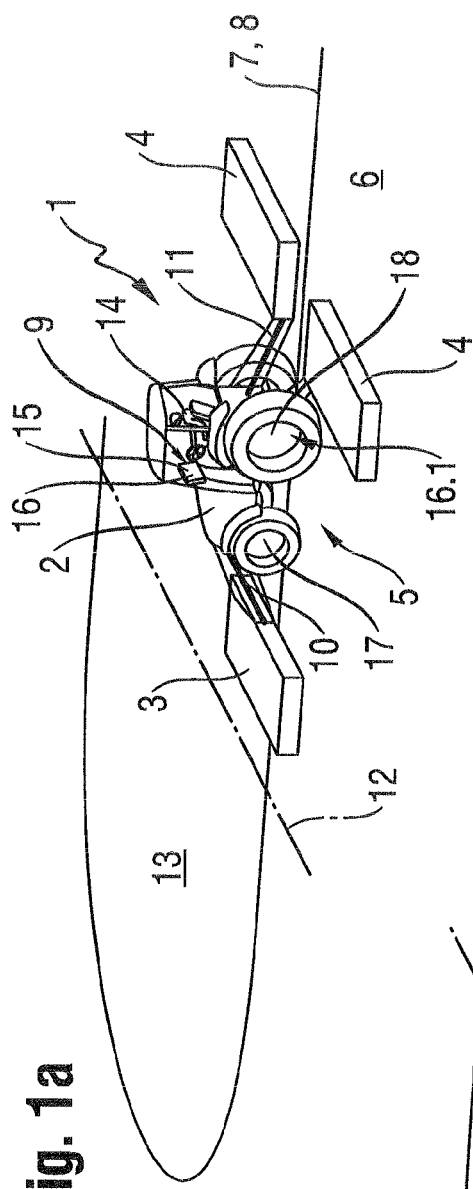
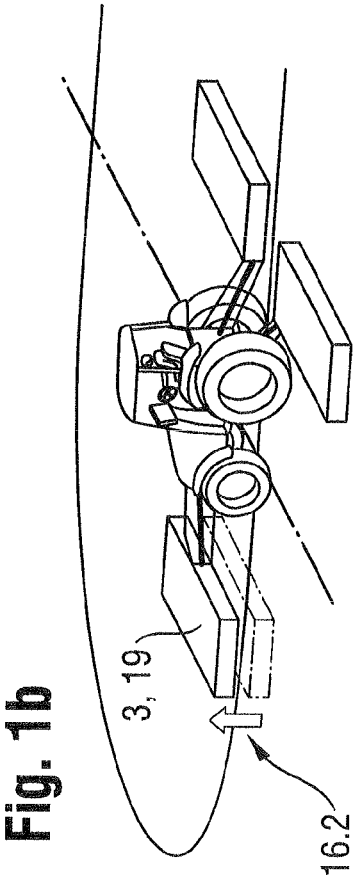
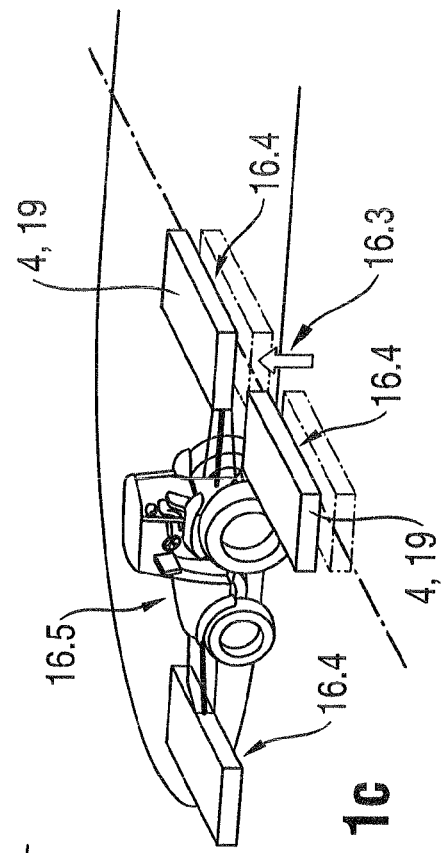
Fig. 1a
Fig. 1b
Fig. 1c

VISUALIZATION DEVICE

CROSS-REFERENCE TO A RELATED APPLICATION

The invention described and claimed hereinbelow is also described in German Patent Application DE 10 2011 054 630.8 filed on Oct. 20, 2011. This German Patent Application, subject matter of which is incorporated herein by reference, provides the basis for a claim of priority of invention under 35 U.S.C. 119(a)-(d).

BACKGROUND OF THE INVENTION

The invention relates to a device for visualizing control operations of an agricultural working machine.

Document EP 0 820 688 made known a device for controlling actuating components of a utility vehicle, in which the driver of the utility vehicle can freely program a control sequence for the utility vehicle and activate the programmed control sequence by actuating a control button. Such systems have the advantage that complicated control operations can be automated, thereby relieving the driver of the working machine of complex control processes. Such automated control routines are used primarily when agricultural working machines are driven in the so-called headland of a territory to be worked. There, upon driving out of the territory to be worked, the first step is typically to reduce the ground speed and to then disengage the working units and raise the working tool. Once the agricultural harvesting machine has turned around in the headland, the sequence is reversed and the working tool must be lowered again, the working units must be engaged, and the ground speed must be increased once more.

Such control processes, which are highly complex over all, can be automated very conveniently using freely programmable control sequences. To ensure that the driver of the agricultural working machine receives information on which control operations are included in the control sequence that was created, a display unit designed as an LC display is provided for visualizing the activated control operations. Such display systems are sufficient primarily in the case of agricultural working machines that are steered by the driver since, in these cases, the driver is directly involved in the vehicle control process.

Such visualization systems reach their limits, however, when the agricultural working machine works automatically determined, predefined driving routes. In these cases, the vehicle operator is no longer directly integrated in the control process and is not entirely able to determine whether the control operations of the activated control sequence correspond with the momentary position of the vehicle. To provide assistance therefor, document EP 2 020 170 provides, among other things, a display device that visualizes the control operations of a preprogrammed control sequence. The visualization ensures that the driver of the agricultural working machine is informed of the control processes to be carried out. In addition to limited operating comfort, however, such systems have the disadvantage in particular that there is no direct link between the control operations to be carried out and the momentary position of the agricultural vehicle on the territory to be worked.

SUMMARY OF THE INVENTION

The present invention overcomes the shortcomings of known arts, such as those mentioned above.

For example, the invention includes a device that establishes a direct link between the position of the agricultural vehicle on the territory to be worked and the particular control operation be carried out, thereby ensuring that even an operator who is not directly integrated in the control process of the agricultural working machine is always informed about the control processes that are taking place.

In an embodiment, a device for visualizing control operations of an agricultural working machine comprises a visualization device assigned to the agricultural working machine that visualizes at least one driving path to be traveled by the agricultural working machine, wherein the control operations are stored in graphic images and the graphic images are displayed in the visualization device along the driving path to be traveled in the order in which they are carried out. Such operation ensures that even an operator who is not directly integrated in the control process of the agricultural working machine is always informed of the control processes that are taking place.

In an embodiment of the invention, the driving path to be traveled is formed by the turnaround path of an agricultural working machine in the headland of a territory to be worked. The headland path preferably comprises a driving route section leading out of the territory to be worked, a headland section and a driving route section leading into the territory to be worked. This has the advantage that the control processes taking place during this time during travel of the agricultural working machine in the so-called headland can be depicted very clearly in the visualization device.

A highly flexible use of the agricultural working machine is achieved in a further advantageous embodiment of the invention when a plurality of control operations forms one control sequence.

To ensure that the operator of the agricultural working machine can precisely and rapidly determine which control operation is currently activated and which control operations still need to be activated, the invention provides that every control operation of a control sequence is visualized by way of an icon comprising image and/or text elements.

An icon representing a control operation is displayed before the particular control operation is carried out, thereby enabling the operator of the agricultural working machine to abort or delay the execution of the upcoming control operation, for example, if external circumstances make this necessary.

Since the icon representing a control operation that has been carried out remains visible in the display unit while subsequent control operations are carried out, the operator of the agricultural working machine always has a complete overview of the control sequence to be carried out.

When a control sequence is activated, all control operations of said control sequence are displayed via visualization of the particular icon, and the icon of the particular control operation to be carried out is emphasized before the particular control operation is carried out. This has the effect, in particular, that the operator can determine quickly, quasi at a glance, which control operation is currently activated and which will be activated next. This effect also is supported in that the particular icon is emphasized via flashing or a color change.

A highly flexible and universal use of the visualization device according to the invention is obtained primarily in that the agricultural working machine is designed as a towing vehicle having at least one adapted working device or is designed as an agricultural harvesting machine comprising a front harvesting attachment. The control operations forming the control sequence result in the working device or front harvesting attachment being moved into a non-working position upon leaving the territory to be worked and result in the working device or front harvesting attachment being moved into a working position upon entering the territory to be worked. In this manner it becomes possible to apply the visualization principle according to the invention in a machine-independent manner.

The control sequence to be carried out can be freely programmable. The control sequence is made freely programmable by an operator via actuation of the control buttons that trigger the particular control operation and/or via editing at the visualization device. A particularly user-friendly free programmability of the control sequence is achieved when the visualization device comprises a touch-screen monitor that has a menu field in which the icons representing the possible control operations are stored, wherein the control sequence is programmed by dragging the particular icon into the visualized driving path to be traveled.

The operator of the agricultural working machine is also greatly relieved when a route plan that is at least partially visualized in the visualization device and at least one track-following system are assigned of the agricultural working machine in such a way that the agricultural working machine automatically follows the predefined driving routes that have been stored in the route plan. Preferably, the route plan also comprises the driving path to be traveled in the headland and the track-following system automatically guides the agricultural working machine along the driving path. The agricultural working machine automatically implements the preprogrammed control sequence comprising the selected control operations.

The track-following system assigned to the agricultural working machine can operate in a manner that is GPS-based and/or camera-based and/or sensor-based. The sensor is designed as a laser sensor. In this manner, a proven technology for the autonomous driving of agricultural working machines is combined with a visualization technology that relieves the operator of the agricultural working machine of the direct control process of the agricultural working machine in the headland to the greatest extent possible. The combination allows the operator to devote more attention to the surrounding conditions during travel in the headland, markedly reducing the risks of accident and collision.

BRIEF DESCRIPTION OF THE DRAWINGS

Further features and advantages of the invention will become apparent from the description of embodiments that follows, with reference to the attached figures, wherein:

FIGS. 1a-c together show a schematic overview of headland management when an agricultural working machine leaves the territory to be worked;

DETAILED DESCRIPTION OF THE PREFERRED EMBODIMENTS

Figure 2:
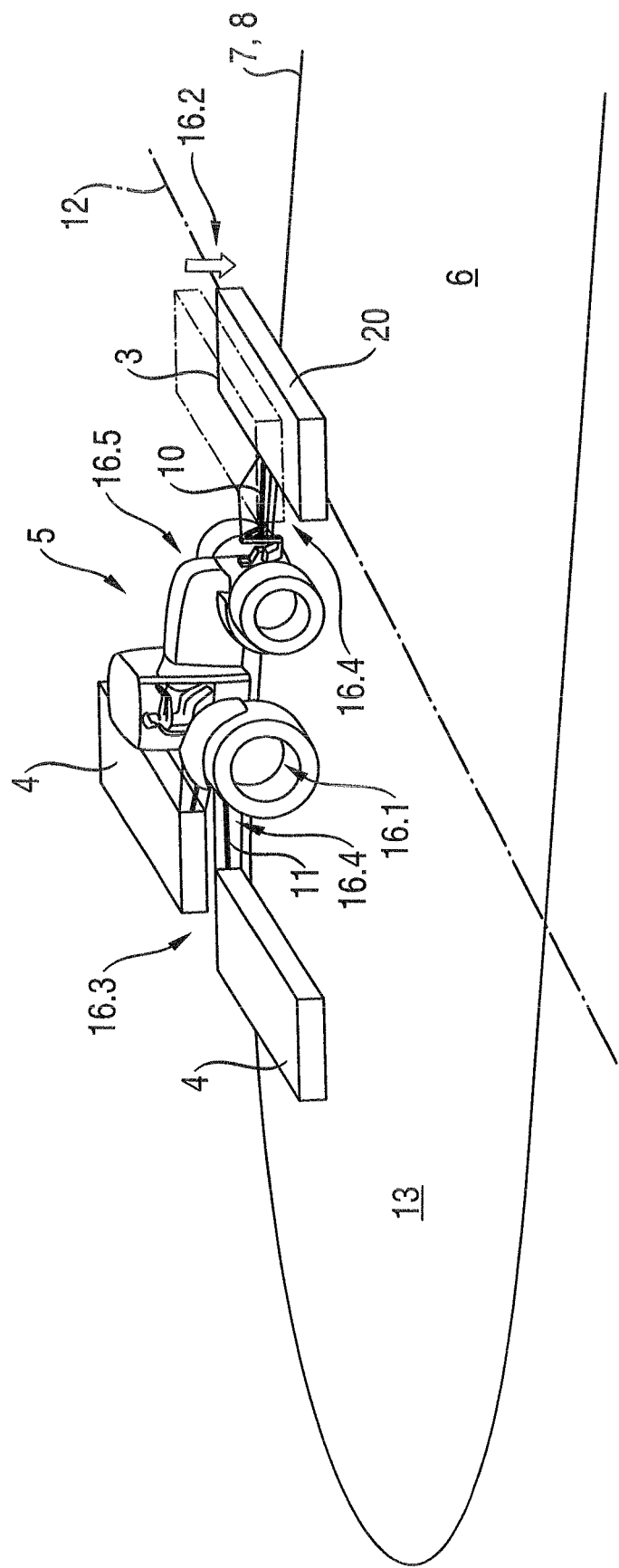
FIG. 2 shows a schematic overview of headland management when an agricultural working machine enters the territory to be worked.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIGS. 1a-c provide shows a schematic depiction of headland management 1 using the example of an agricultural working machine 5 designed as a tractor (2)—cutting mechanism (3, 4) combination. The agricultural working machine 5 moves on the territory 6 to be worked, i.e. the field, along driving paths 7 to be traveled. The driving paths 7 to be traveled are stored in a route plan 8 (to be described in greater detail below), in a control/regulating device 9 assigned to the tractor 2. A mower unit 3 assigned to the tractor on the front side and a mower unit 4 assigned thereto on the rear side are driven via the front and rear P.T.O. shafts 10, 11 of the tractor 2. When the tractor 2 approaches a boundary line 12 that separates the territory 6 to be worked from the so-called headland region 13, the headland management 1 is either automatically activated or is triggered by the operator 14 of the agricultural working machine 5.

In the example depicted, a control sequence 15 stored in the control/regulating device 9 is activated before the boundary line 13 is reached. The control sequence triggers one or more control operations 16 depending on time, travel or event. A first activated control operation 16.1 results in deactivation of the differential lock at one or more of the vehicle axles 17, 18, thereby improving the steerability of the vehicle during the change in direction of motion that is necessary in the headland 13.

When the mower unit 3 driven by the front P.T.O shaft 10 reaches the boundary line 13, a control operation 16.2 is triggered. Control operation 16.2 results in the front mower unit 3 being swiveled in the vertical direction into a non-working position 19 (FIG. 1b).

According to FIG. 1c, a control operation 16.3 is triggered when the rear-adapted mower unit 4 has reached the boundary line 12. Control operation 16.3 results in the rear mower unit 4 being raised into a non-working position 19. Depending on the structure of the control sequence 15, a control operation 16.4 results in deactivation of the front and rear P.T.O shafts 10, 11, and so the mower units 3, 4 are shut off before the agricultural working machine 5 is turned. In a control operation 16.5, the ground speed of the agricultural working machine 5 is adapted to the travel in the headland region 13. This ground speed adapting can be either a reduction or an increase in the ground speed.

According to FIG. 2, when the agricultural working machine 5 has finally passed through the headland region 13 and is moving along a predefined driving route 5 back toward the boundary line 12 that separates the headland region 13 from the territory 6 to be worked, the previously activated control operations 16.1-16.5 are implemented once more, in a different order. That is, the ground speed of the agricultural working machine is adjusted first (control operation 16.5). Next, the front and rear P.T.O. shafts 10, 11 are actuated (control operation 16.4) and the front mower unit 3 is lowered back into a working position 20 until the boundary line 12 is reached (control operation 16.2). When the rear mower unit 4 reaches the boundary line 12, it is also lowered back into a working position 20, which is not shown (control operation 16.3). Finally, if all mower units 3, 4 are in the working position 20 and the agricultural working machine 5 travels on the driving path 7 to be traveled (determined by a route plan 8), the differential lock is reactivated (control operation 16.1).

Figure 3:
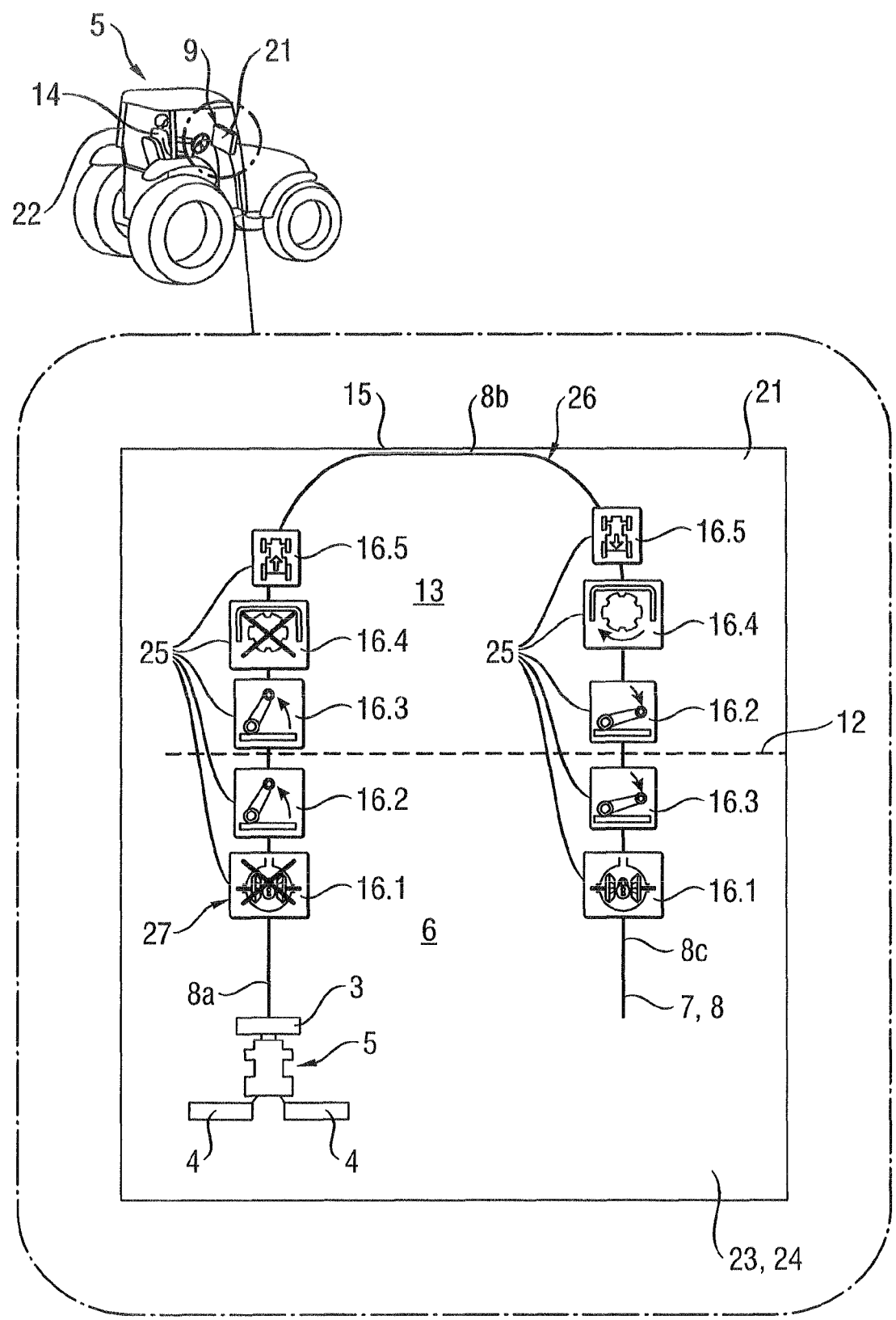
FIG. 3 shows a schematic depiction of the visualization device according to the present invention.

To ensure that the driver 14 of the agricultural working machine 5 is precisely instructed about the execution of the selected control sequence 15, the agricultural working machine 5 comprises a visualization device 21, as shown in FIG. 3. The visualization device 21 can either be a component of the previously described control/regulating device 9 or can be disposed separately in the driver's cab 22 of the agricultural working machine 5.

The visualization device 21 comprises a display 23, which is preferably designed as a touchscreen monitor 24. In the display 23, the territory 6 to be worked and the headland region 13 are depicted at least in sections or, optionally, in entirety. Furthermore, the agricultural working machine 5, which is the tractor (2), cutting mechanism (3, 4) combination in this case, and the driving path 7 to be traveled by the agricultural working machine 5 are visualized. The position of the visualized agricultural working machine 5 is determined by way of GPS systems, which are known per se. The driving path 7 to be traveled is called up from a preprogrammed route plan 8. The control operations 16.1-16.5 to be carried out by the agricultural working machine 5 also are visualized (depicted) in the display 23 of the visualization device 21 by way of graphic images 25, which are assigned directly to the driving path 7 to be traveled by the agricultural working machine 5 and are positioned in the order in which they are carried out.

In analogy to the headland management 1 depicted in FIGS. 1 and 2, the driving path 7 visualized in the display 23 forms the so-called visualization device 21. The visualization device 21 comprises a driving route section 8a leading out of the territory 6 to be worked, a headland section 8b and a driving route section 8c leading into the territory 6 to be worked. The example shown is merely one of a plurality of possible control sequences 15 that depend on the type of particular agricultural working machine 5 and the shape of the driving path 7 to be traveled, which control sequence 15 comprises a plurality of control operations 16 visualized in the display.

To ensure that the graphic images 25 representing the particular control operation 16.1-16.5 are easily understood by the operator 14 of the agricultural working machine 5, the graphic images 25 are designed as icons 27 comprising image and/or text elements. Word elements are not used in the exemplary embodiment shown according to FIG. 3.

In addition, the icons 27 are assigned to the driving path 7 to be traveled ahead of the execution of the control operation 16 they represent. That is, the particular icon 27 is assigned to a geographic point of the driving path 7 to be traveled at which the particular control operation 16.1-16.5 has not yet been activated. The icon 27 representing a control operation 16.1-16.5 also remains visible after the particular control operation 16.1-16.5 has been carried out. This ensures that the operator 14 of the agricultural working machine 5 always has an overview of the entire control sequence 15 to be carried out.

Figure 4:
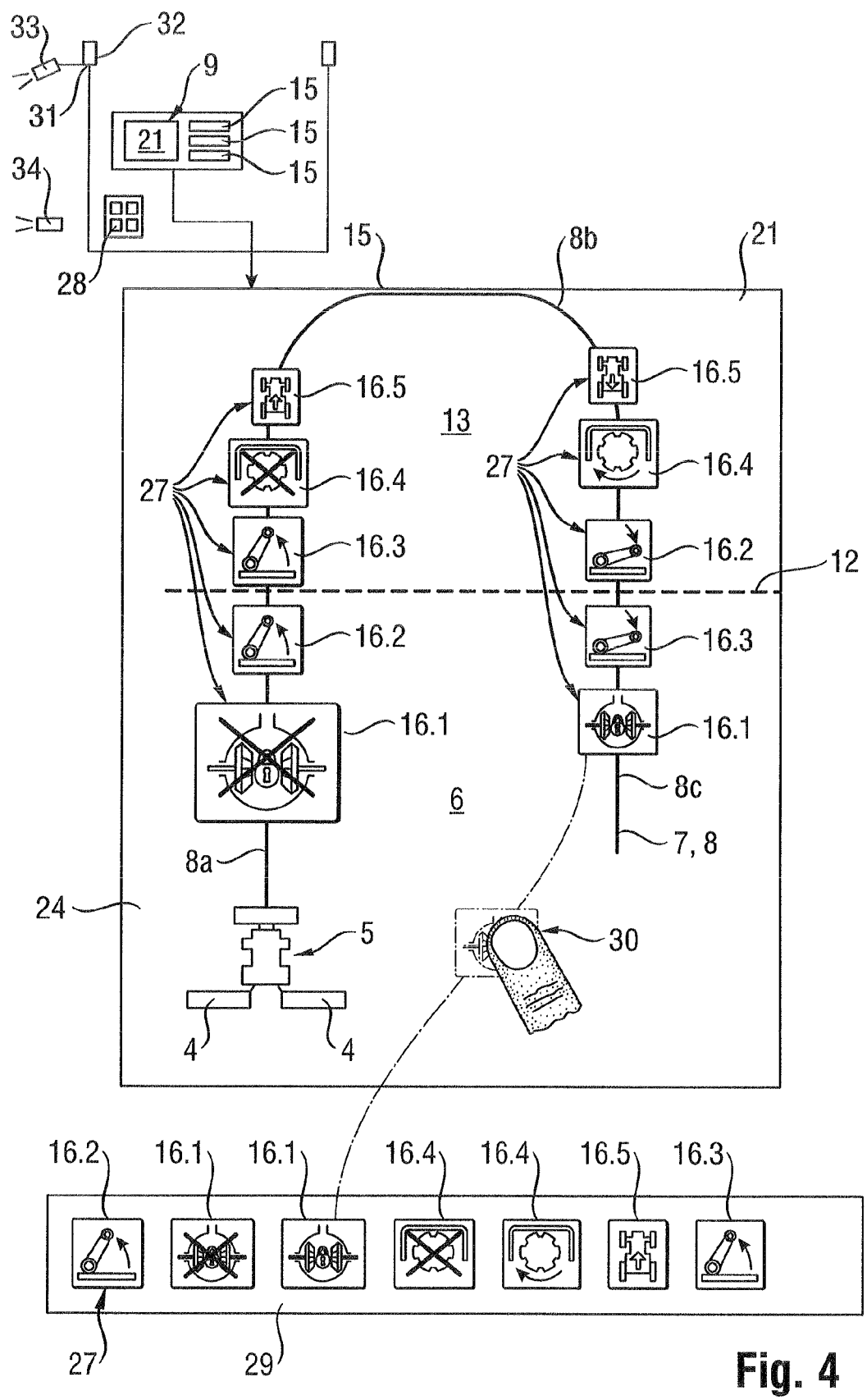
FIG. 4 shows a further detailed view of the visualization device according to the invention.

As shown in FIG. 4, the visualization of the control operations 16.1-16.5 is structured in such a way that, when a control sequence 15 is activated, all control operations 16.1-16.5 of the control sequence 15 are displayed via visualization of the particular icon 27, and the icon 27 of the particular control operation 16.1 to be carried out is emphasized before the particular control operation 16.1-16.5 is carried out. In FIG. 4, the applicable icon 27 is shown enlarged. It should be clear, however, that the particular icon 27 also can be emphasized by way of flashing or a color change. For that matter, it also is within the scope of the invention for the agricultural working machine 5 to be designed as any type of towing vehicle comprising at least one adapted working device or as an agricultural harvesting machine comprising a front harvesting attachment. The invention also anticipates that the control operations 16 forming the control sequence 15 can result in the working device or the front harvesting attachment being moved into a non-working position 19 upon leaving the territory 6 to be worked and to result in the working device or the front harvesting attachment being moved into a working position 20 upon entering the territory 6 to be worked.

It is also within the scope of the invention for the control sequences 15 stored in the control/regulating device 9 to be freely programmable, i.e. the control operations 16 to be implemented in the particular control sequence 15 can be freely selected, stored and called up. The control sequences 15 are freely programmable by an operator 14 via actuation of the control buttons 28 that trigger the particular control operation 16 and/or via editing at the visualization device 21. If the visualization device 21 is also designed as a touchscreen monitor 24 that comprises a menu field 29 in which the icons 27 representing the possible control operations 16.1-16.5 are stored, the control sequence 15 can be programmed, for example, by moving the particular icon 27 into the visualized driving path 7 to be traveled via dragging 30.

It is also within the scope of the invention for a route plan 8 that is at least partially visualized in the visualization device 21 and at least one track-following system 31 to be assigned to the agricultural working machine 5 in such a way that the agricultural working machine 5 automatically follows the predefined driving routes 7 that are stored in the route plan 8. Fully autonomous driving of the agricultural working machine 5 on the territory 6 to be worked and in the headland region 13 is achieved when the route plan 8 also includes the driving path 8b to be traveled in the headland region 13 and the track-following system 31 automatically guides the agricultural working machine 5 along said driving path 8b and the agricultural working machine 5 automatically implements the preprogrammed control sequence 15 that comprises the selected control operations 16. The track-following system 31 assigned to the agricultural working machine 5 is preferably a GPS-based track-following system 32, a camera-based track-following system 33 or a sensor-based track-following system 34, wherein infrared or laser sensors are utilized. Alternatively, the track-following system may comprise a combination of said track-following systems 32-34.

The following list of reference signs of various elements mentioned above is included (as follows), for ease of explanation:

LIST OF REFERENCE CHARACTERS 1 headland management
2 tractor
3 cutting mechanism
4 cutting mechanism
5 agricultural working machine
6 territory
7 driving path to be traveled
8 route plan
9 control/regulating unit
10 front P.T.O shaft
11 rear P.T.O shaft 12 boundary line
13 headland region
14 operator
15 control sequence
16.1—control operation
16.5
17 vehicle axle
18 vehicle axle
19 non-working position
20 working position
21 visualization device
22 driver's cab
23 display
24 touchscreen monitor
25 graphic images
26 turning path
27 icon
28 operating buttons
29 menu field
30 dragging the icon
31 track-following system
32 GPS-based track-following system
33 camera-based track-following system
34 sensor-based track-following system As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A device for visualizing control operations of an agricultural working machine in a headland, comprising:
a visualization device (21) arranged in the agricultural working machine, wherein a position of the agricultural working machine is determined using a GPS system, and wherein the visualization device (21) visualizes the agricultural working machine and at least one driving path (7) to be traveled by the agricultural working machine that is formed by a turning path (26) of the agricultural working machine (5) in the headland (13) of a territory (6) to be worked, the turning path (26) comprising a driving route section (8a) leading out of the territory (6) to be worked, a headland section (8b) and a driving route section (8c) leading into the territory (6) to be worked; and
a control/regulating device (9) arranged in the agricultural working machine that stores the at least one driving path (7) formed by the turning path (26) and a control sequence (15) of control operations (16) that are implemented to control the agricultural working machine during travel along the driving path (7) formed by the turning path (26) in the headland;
wherein graphic images (25) of the control operations (16) are assigned to the driving path (7) to be traveled ahead of execution of the control operations (16) that the graphic images (25) represent and are displayed in the visualization device (21) along the driving path (7) to be traveled in an order in which the control operations (16) are carried out;
wherein the visualization device (21) comprises a touchscreen monitor (24) that has a menu field (29) in which icons (27) representing the possible control operations (16) are stored, and
wherein the control sequence (15) of the control operations is programmed by dragging (30) a particular icon (27) from the menu field (29) into the visualized driving path (7) formed by the turning path (26) to be traveled in the headland.

2. The device for visualizing control operations of an agricultural working machine according to claim 1, wherein a plurality of control operations (16.1-16.5) forms the control sequence (15).

3. The device for visualizing control operations of an agricultural working machine according to claim 2, wherein each control operation (16) of the control sequence (15) is visualized by an icon (27) comprising image elements, text elements or both.

4. The device for visualizing control operations of an agricultural working machine according to claim 3, wherein an icon (27) representing a particular control operation (16) is displayed before the execution of the particular control operation (16).

5. The device for visualizing control operations of an agricultural working machine according to claim 4, wherein the icon (27) representing a control operation (16) that has been carried out remains visible in the visualization device (21) while subsequent control operations (16) are carried out.

6. The device for visualizing control operations of an agricultural working machine according to claim 3, wherein, when a control sequence (15) is activated, all control operations (16) of said control sequence (15) are displayed via visualization of the particular icon (27), and the icon (27) of the particular control operation (16) to be carried out is emphasized before the particular control operation (16) is carried out.

7. The device for visualization of control operations of an agricultural working machine according to claim 6, wherein the particular icon (27) is emphasized via flashing or a color change.

8. The device for visualizing control operations of an agricultural working machine according to claim 1, wherein the agricultural working machine (5) comprises a towing vehicle (2) having at least one adapted working device (3, 4) or an agricultural harvesting machine having a front harvesting attachment, and wherein the control operations (16) forming the control sequence (15) result in the working device (3, 4) or the front harvesting attachment being brought into a non-working position (19) upon leaving the territory (6) to be worked, and result in the working device (3, 4) or the front harvesting attachment being moved into a working position (20) upon entering the territory (6) to be worked.

9. The device for visualizing control operations of an agricultural working machine according to claim 1, wherein the control sequence (15) is freely programmable.

10. The device for visualizing control operations of an agricultural working machine according to claim 9, wherein the control sequence (15) is made freely programmable by an operator (14) via actuation of control buttons (28) that trigger a particular control operation (16), via editing at the visualization device (21), or both.

11. The device for visualizing control operations of an agricultural working machine according to claim 1, wherein a route plan (8) that is at least partially visualized in the visualization device (21) and at least one track-following system (31) are assigned to the agricultural working machine (5) in such a way that the agricultural working machine (5) automatically follows the predefined driving routes (7) stored in the route plan (8).

12. The device for visualizing control operations of an agricultural working machine according to claim 11, wherein the route plan (8) includes the driving path (7) formed by the turning path (26) to be traveled in the headland region (13), the track-following system (31) automatically guides the agricultural working machine (5) along said driving path (7) formed by the turning path (26) and the agricultural working machine (5) automatically implements the preprogrammed control sequence (15) comprising the selected control operations (16).

13. The device for visualizing control operations of an agricultural working machine according to claim 11, wherein the track-following system (31) operates in one or more manners selected from the group consisting of: a GPS-based (32) manner, a camera-based (33) manner and a sensor-based (34) manner.

14. A device for visualizing control operations of an agricultural working machine according to claim 13, wherein the track-following system operation that operates in a sensor-based manner includes a laser sensor.

15. The device according to claim 11, wherein the icons (27) comprising the programmed control sequence (15) are linked to the route plan (8) in a particular order.

16. The device according to claim 1, wherein a headland routine for implementing the control sequence (15) as the agricultural working machine travels the turning path (26) is user activated.

17. The device according to claim 16, wherein during the agricultural working machine travel upon the turning path (26), as each control operation (16) in the sequence of stored control operations is implemented, a visibility of the icons (27) representing each of the implemented control operations changes to distinguish same from a control operation the sequence of stored control operations not yet implemented.

18. A device for visualizing control operations of an agricultural working machine in a headland, comprising:

a touchscreen monitor (24) arranged in the agricultural working machine, wherein a position of the agricultural working machine is determined using a GPS system, and wherein the touchscreen monitor (24) visualizes at least one driving path (7) to be traveled by the agricultural working machine including a turning path (26) of the agricultural working machine (5) in the headland (13) of a territory (6) to be worked, the turning path (26) comprising a driving route section (8a) leading out of the territory (6) to be worked, a headland section (8b) and a driving route section (8c) leading into the territory (6) to be worked; and a control/regulating device (9) arranged in the agricultural working machine that stores the at least one driving path and a control sequence (15) of control operations (16) that are implemented as the agricultural working machine travels at least along the turning path (26) to be traveled in the headland (13);

wherein graphic images (25) of the control operations (16) are assigned to the driving path (7) to be traveled ahead of execution of the control operations (16) that the graphic images (25) represent and are displayed by the touchscreen monitor (24) at least along the turning path (26) to be traveled in the headland (13) in an order in which the control operations (16) are carried out;

wherein the touchscreen monitor (24) that has a menu field (29) in which icons (27) representing the possible control operations (16) are stored, and wherein the control sequence (15) is programmed using the touchscreen monitor (24) by dragging (30) a particular icon (27) into at least the visualized turning path (26) to be traveled in the headland from the menu field (29).

* * * * *